(12) United States Patent
Soomro et al.

(10) Patent No.: US 8,023,415 B2
(45) Date of Patent: Sep. 20, 2011

(54) MEASURING AND MONITORING QOS IN SERVICE DIFFERENTIATED WIRELESS NETWORKS

(75) Inventors: Amjad Soomro, Hopewell Junction, NY (US); Zhun Zhong, Croton-On-Hudson, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 463 days.

(21) Appl. No.: 11/814,401

(22) PCT Filed: Jan. 20, 2006

(86) PCT No.: PCT/IB2006/050575
§ 371 (c)(1),
(2), (4) Date: Jul. 20, 2007

(87) PCT Pub. No.: WO2006/077562
PCT Pub. Date: Jul. 27, 2006

(65) Prior Publication Data
US 2008/0144521 A1    Jun. 19, 2008

Related U.S. Application Data

(60) Provisional application No. 60/646,085, filed on Jan. 21, 2005.

(51) Int. Cl.
*H04J 3/14* (2006.01)
(52) U.S. Cl. ........................ 370/241; 370/252
(58) Field of Classification Search .......... None
See application file for complete search history.

(56) References Cited

U.S. PATENT DOCUMENTS

| | | | |
|---|---|---|---|
| 6,377,548 B1* | 4/2002 | Chuah | 370/233 |
| 6,490,281 B1* | 12/2002 | Abler et al. | 370/394 |
| 6,980,540 B1* | 12/2005 | Laroia et al. | 370/345 |
| 2003/0067903 A1* | 4/2003 | Jorgensen | 370/338 |
| 2003/0223362 A1* | 12/2003 | Mathews et al. | 370/230 |
| 2004/0037327 A1* | 2/2004 | Torsner et al. | 370/517 |
| 2004/0058652 A1* | 3/2004 | McGregor et al. | 455/67.13 |
| 2005/0141476 A1* | 6/2005 | Choi et al. | 370/348 |
| 2005/0190771 A1* | 9/2005 | Tan et al. | 370/395.21 |
| 2006/0019665 A1* | 1/2006 | Aghvami et al. | 455/444 |
| 2006/0067443 A1* | 3/2006 | Liu et al. | 375/347 |
| 2010/0020772 A1* | 1/2010 | Yi et al. | 370/336 |

FOREIGN PATENT DOCUMENTS

| | | |
|---|---|---|
| EP | 1107509 A2 | 6/2001 |
| EP | 1156623 A | 11/2001 |
| EP | 1515487 A | 3/2005 |

OTHER PUBLICATIONS

Cisco Class-Based QoS Configuration and Statistics MIB, by Cisco Systems.
Hofmann et al., "QoSPY an Approach for QoS Monitoring in DiffServ Networks"., Feb. 2003.
Wang et al., "QoSME: Toward QoS Management and Guarantees", Aug. 2000.

* cited by examiner

*Primary Examiner* — Kevin C Harper
(74) *Attorney, Agent, or Firm* — Larry Liberchuk

(57) ABSTRACT

A wireless network (100) includes a plurality of wireless stations (QSTAs) (102) and an access point (QAP) (101). The QAP, or one or more of the QSTAs, or both, are adapted to measure delay data, or queue data, or both, per one or more traffic type. A method of wireless communication is also described.

20 Claims, 7 Drawing Sheets

| 501 | 502 | 503 | 504 | 505 |
|---|---|---|---|---|
| Element ID | Length Element | Offset Bin Element | Number Of Bins Element | Bin Interval |
| 1 | 1 | 1 | 1 | 1 |

FIG. 5A

| 506 | 507 | 508 | 509 | 510 | 511 | 512 | | 513 |
|---|---|---|---|---|---|---|---|---|
| Element ID | Length Element | Free Bit Offset Element | Number Of Bins Element | Bin Interval | Bin #1 Value Element | Bin #2 Value Element | .... | Bin #N Value Element |
| 1 | 1 | 1 | 1 | 1 | 1 | 1 | | 1 |

FIG. 5B

| | |
|---|---|
| 701 — report per STA | 0 |
| 702 — per AC | 1 |
| 703 — per TS | 2 |
| 704 — per UP | 3 |

FIG. 7

| | |
|---|---|
| 801 — average delay | 0 |
| 802 — maximum delay | 1 |
| 803 — minimum delay | 2 |
| 804 — standard deviation delay | 3 |
| 805 — variance of delay | 4 |
| 806 — histogram of delay | 5 |
| 807 — average queue length | 6 |
| 808 — max. queue length | 7 |
| 809 — min. queue length | 8 |
| 810 — std. dev. queue length | 9 |
| 811 — variance queue length | 10 |
| 812 — histogram of queue length | 11 |

FIG. 8A

| 813 | 814 | 815 | 816 | 817 |
|---|---|---|---|---|
| Aggregated Frame Type Element | N/tot of frames | Measured QoS Parameter Element Map | Sizing Code | QoS Parameter Histogram |
| 1 | 1 | 2 | 2 | |

FIG. 8B

MEASURING AND MONITORING QOS IN SERVICE DIFFERENTIATED WIRELESS NETWORKS

The use of wireless connectivity in data and voice communications continues to increase. To this end, the wireless communication bandwidth has significantly increased with advances of channel modulation techniques, making wireless local area networks (WLANs) a viable alternative to wired and optical fiber solutions.

As is known, standards often govern WLANs. One such standard is IEEE 802.11. IEEE 802.11 is a standard that covers the specification for the Medium Access Control (MAC) sub-layer and the Physical (PHY) layer of the WLAN.

While the 802.11 standard has provided for significant improvement in the control of voice and data traffic, the continued increase in the demand for network access at increased channel rates while supporting quality-of-service (QoS) requirements has resulted a continuous evaluation of the standard and certain changes thereto. For example, much effort has been placed on support for real-time multimedia services in WLAN's (e.g., streaming video), as well as the continued support of legacy voice and data traffic in the network. IEEE 802.11E addresses these issues to some extent.

The 802.11E standard arose out of the need to transmit multimedia and legacy traffic over a common channel. As can be appreciated, multimedia traffic requires different amounts of bandwidth, and different access latency time to the channel than many legacy applications. In an attempt to improve the efficiency of a network through coordination of access to the medium, the access point (QAP) or host of the network grants access to the medium by one of a variety of methods. This granting of access to the medium is based on criteria, and is often referred to as service differentiation.

One technique used to attempt to coordinate the access/use of the operating channel of the WLAN is polling. Polling is a process where a wireless station (QSTA) sends a transmission to the QAP with certain requirements such as the stream requirements. Each QSTA will transmit the requirements of an application to the QAP, which reserves the medium (channel) according to requirements. In this manner, access to the medium is granted by specific access requirements, rather than by general application type. This type of medium access reservation is referred to as traffic specification (TSPEC) negotiation and is a type of service differentiation.

After receiving the request, the QAP then either rejects the request or accepts it. The QSTAs with accepted streams are issued polls which are effectively a granting of grant channel access rights for the indicated duration.

Another prioritization method is contemplated in the 802.11E standard. This method categorizes applications into traffic classes and each class has different priority of access. In this method each class of traffic, or traffic type, has different probability of access to the channel than lower priority traffic.

While the methods of service differentiation (channel access granting or channel priority) outlined above have increased the capabilities of wireless systems significantly, increased application requirements require further improvements. One known improvement is through monitoring and measurement of various channel data that are embodied in proposed amendments 802.11H and 802.11K.

The proposed 802.11H amendment includes monitoring of the frequency to ensure that certain radar devices are not transmitting. If these devices are transmitting, the QAP requires the QSTAs to change to a different channel frequency, for example, to avoid interfering with the radar.

The proposed 802.11K amendment includes monitoring and measuring information regarding neighboring QAPs by the present QAP; information about nodes hidden from the QAP or other QSTAs; and noise histograms that are acquired over defined time periods.

The measuring and monitoring techniques of 802.11H and 802.11K can be useful in improving the network manageability in wireless networks. However, these known network measuring and monitoring techniques are not adept to the needs of service differentiated networks. For example, current measuring and monitoring methods fail to differentiate between different types of traffic.

What is needed therefore is a method and apparatus of wireless communication that overcomes at least the shortcomings of known methods and apparati described above.

In accordance with an example embodiment, a wireless network includes a plurality of wireless stations (QSTAs) and an access point (QAP). The QAP, or one or more of the QSTAs, or both, are adapted to measure delay data, or queue data, or both, per one or more traffic type.

In accordance with another example embodiment, a method of wireless communication includes measuring delay data, or queue data, or both, per one or more traffic type; and, if necessary, taking an action based on the data.

The example embodiments are best understood from the following detailed description when read with the accompanying drawing figures. It is emphasized that the various features are not necessarily drawn to scale. In fact, the dimensions may be arbitrarily increased or decreased for clarity of discussion.

FIG. 5a is a QoS parameter histogram measurement request element format of a frame in accordance with an example embodiment.

FIG. 5b is a QoS parameter histogram report element format of a frame in accordance with an example embodiment.

FIG. 7 is a QoS parameter measurement aggregation type field in accordance with an example embodiment.

FIG. 8a is a QoS parameter request element map field in accordance with an example embodiment.

FIG. 8b is a QoS parameter measurement report frame body format in accordance with an example embodiment.

In the following detailed description, for purposes of explanation and not limitation, example embodiments disclosing specific details are set forth in order to provide a thorough understanding of the present invention. However, it will be apparent to one having ordinary skill in the art having had the benefit of the present disclosure, that the present invention may be practiced in other embodiments that depart from the specific details disclosed herein. Moreover, descriptions of well-known devices, methods and materials may be omitted so as to not obscure the description of the present invention. Wherever possible, like numerals refer to like features throughout.

Briefly, the example embodiments relate to the monitoring, storing, requesting and reporting of data in service differentiated wireless networks. Illustratively, the data are delay data and queue data. In example embodiments, the delay data or queue data, or both, may be collected per access category, per traffic stream, per user priority or per station. It is noted that these traffic types are merely illustrative and these data may be collected for other traffic types that are within the purview of the artisan of ordinary skill in the wireless arts.

Beneficially, the access to the data enables a QSTA or a QAP to know the level of the QoS being achieved and the knowledge of the system state (delays, queue lengths, etc). Moreover, with these data, the QAP may recognize a problem (delay or unacceptable queue) that is occurring, or that may occur if a trend continues; where the problem is occurring; and the magnitude of the problem. The QAP may then take corrective or mitigating steps to attempt to resolve the problem. In addition, with these data, a QSTA may make certain decisions, such as the decision to join a neighboring network, or to request a greater amount of time to access the medium.

Figure 1:
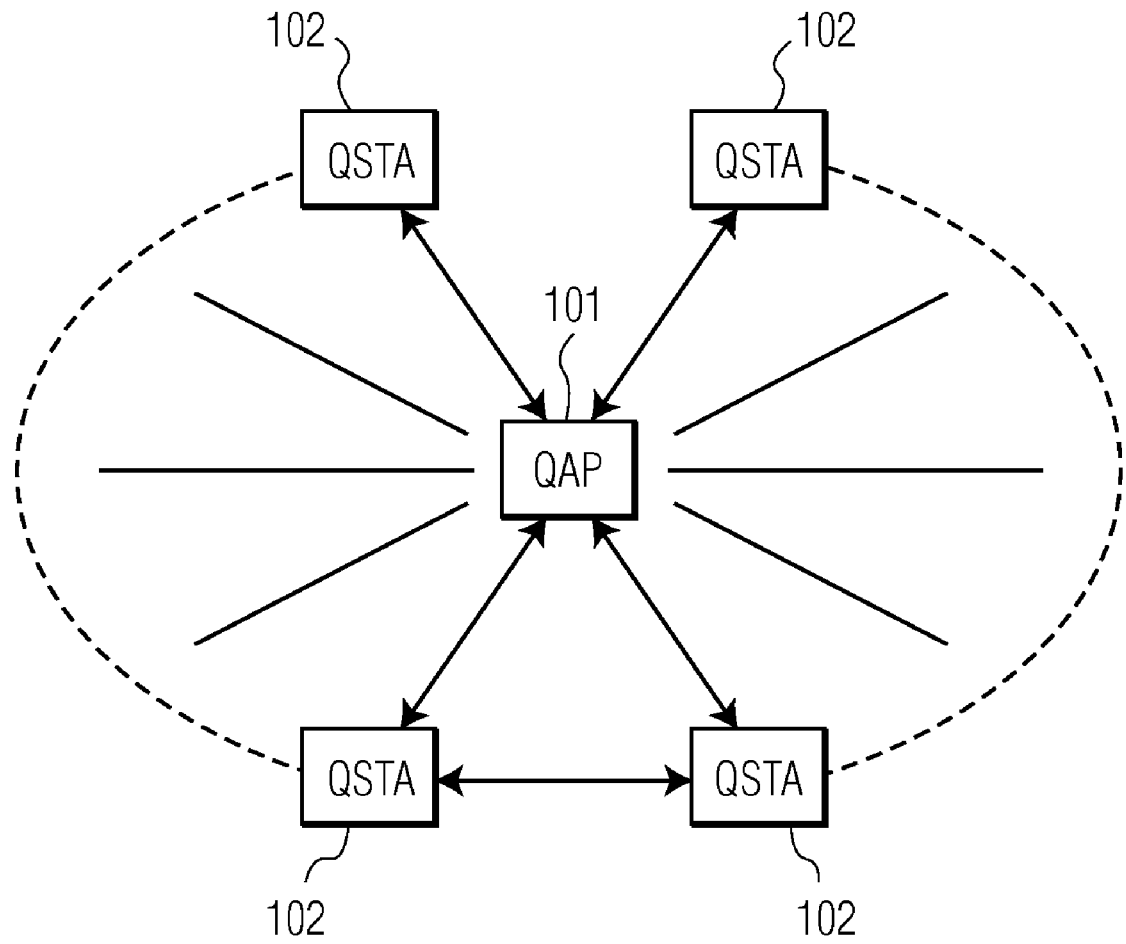
FIG. 1 is a block diagram of a wireless local area network in accordance with an example embodiment.

FIG. 1 shows a network 100 in accordance with an example embodiment. The network 100 includes at least one QAP 101, which is connected by wireless infrastructure (not shown) to a plurality of QSTA's 102. It is noted that in the example embodiment four QSTA's 102 are shown. This is done to promote clarity in the discussion of the example embodiments.

The QSTA's 102 are illustratively portable devices such as personal computers, consumer appliances, handsets, personal digital assistants (PDAs) and other devices usefully connected via a network. In accordance with example embodiments, the network 100 and its elements substantially comply with the IEEE 802.11 standard, and its progeny. Illustratively, the network 100 is a WiFi network or other type of wireless local area network (WLAN). The network 100 also includes the modifications and improvements of the example embodiments of the present application.

In operation the QAP 101 dictates the communications between the various QSTAs 102. To this end, the QAP 101 coordinates the transmission of voice, video and data by the QSTAs 102. In accordance with an example embodiment the QSTAs 102 are connected to one another only through the QAP 101. In accordance with another example embodiment, the QSTA's may be in communication with one or more QSTA's without having to transmit first to the QAP 101. The former embodiment is referred to as an uplink, while the latter is referred to as a direct link. While the details of these aspects of the WLAN 100 are germane to a general understanding of the example embodiments, these details are generally known to one of ordinary skill in the art. As such, these details are not included so as to avoid obscuring the description of the example embodiments.

Figure 2:
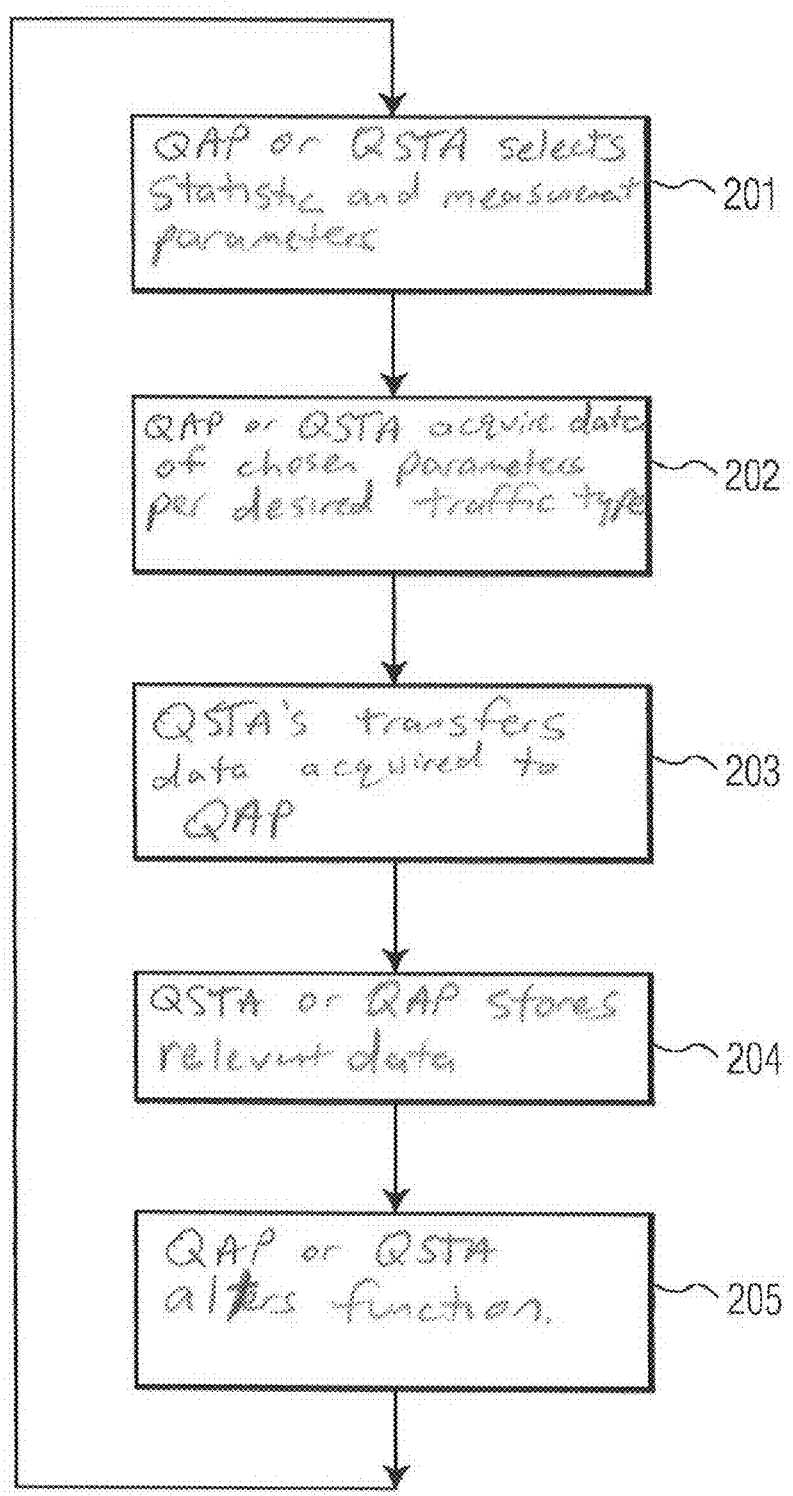
FIG. 2 is flow chart of a method of acquiring and storing delay, or queue data, or both, in accordance with an example embodiment.

FIG. 2 is a flow chart of a method of acquiring and storing delay data, or queue data, or both, in accordance with an example embodiment. The method of FIG. 2 is described in conjunction with the network 100 of FIG. 1. It is emphasized that this is merely illustrative and it is contemplated that the present method may be implemented in other types of wireless networks. As referenced previously, the QAP 101 or QSTA(s) 102, or both, desirably acquire and store delay or queue data of a chosen traffic type or variety of traffic types. To this end, in certain example embodiments, the QAP acquires and stores delay or queue data. In other example embodiments, one or more of the QSTAs 102 acquires and stores delay queue data. In still other example embodiments, the QAP 101 and one or more of the QSTAs 102 acquire delay or queue data.

At step 201, the QAP 101 or the QSTA(s) 102 selects the statistic and measurement parameters. These parameters include, but are not limited to: the average delay, the maximum delay, the minimum delay, the standard deviation or variance of the delay, and a histogram of the delay. Similarly, the QAP 101 or QSTAs 102 may choose from the following statistic and measurement parameters in relation to the queue: the average queue length, the maximum queue length, the minimum queue length, the standard deviation or variance of the queue length, and a histogram of the queue length.

At step 202, the QAP 101 or the QSTAs 102, or both, acquire the desired data of the chosen parameters per a desired traffic type or plurality of traffic types. Again, these traffic types include, but are not limited to an access category, a traffic stream, a user priority or a station. The acquisition of the data is effected by monitoring the performance with respect to a particular parameter in a chosen traffic type. For example, the QAP 101 may monitor the delay per access category over a beacon interval or a service interval in order to determine the average delay in this interval. Alternatively, the acquiring of germane data may be effected through a request by one node of another node. For example, if the QAP desires delay or queue data related to a traffic type from a QSTA, it may acquire these data from the QSTA via a request.

At step 203, optionally, one or more of the QSTAs 102 transfer data acquired to the QAP 101. This transfer may be the result of a request for the transfer from the QAP 101 to the QSTA(s) 102; or may be an unsolicited transfer from the QSTA(s) 102 to the QAP 101.

At step 204 the QSTA 102 or the QAP 101 stores the relevant data. Moreover, if calculations are to be made, these may be effected at step 204. For example, the QAP 101 may desire a statistical mean of the queue length over a prescribed number of packets of data. During step 204, and after acquiring the data in step 202, the QAP 101 may calculate the mean.

At step 205, if necessary, based on the data acquired, the QAP 101 or QSTAs 102 may alter their function. The altering may be one of a variety of actions. Moreover, more than one action may be taken by the subject QSTA or QAP. Illustratively, if after acquiring data related to maximum delay, the QAP 101 determines that the maximum delay is well below a threshold permissible delay for streaming video, the QAP 101 may increase the time allocated to packets of other types of data (e.g., voice) that have a much lower threshold for maximum delay. By doing this, the streaming video may remain under its threshold maximum delay (albeit now with greater delay than before the curative action taken by the QAP), and other data can be more quickly communicated. Thereby, the throughput and efficiency with respect to these other types of data increases, without sacrificing the quality of the video communication.

Noteworthy is the fact that the acquisition and storing of data in steps 202 and 204 do not need to be completed before the action of step 205 is carried out. For example, if during the acquiring of the queue length of per access category a threshold limit nearing, the QAP 101 may take certain remedial action to avoid reaching or exceeding the threshold.

After completion of the remedial action of step 205, the process may be repeated as desired, beginning at step 201. It is noted, of course, that if action is taken before the completion of a particular time period or number of data points desired, the continued acquisition storage and analysis of data may continue per steps 202 and 204. Moreover, the illustrative method contemplates the parallel execution of steps 202-205 as needed.

Figure 3A:
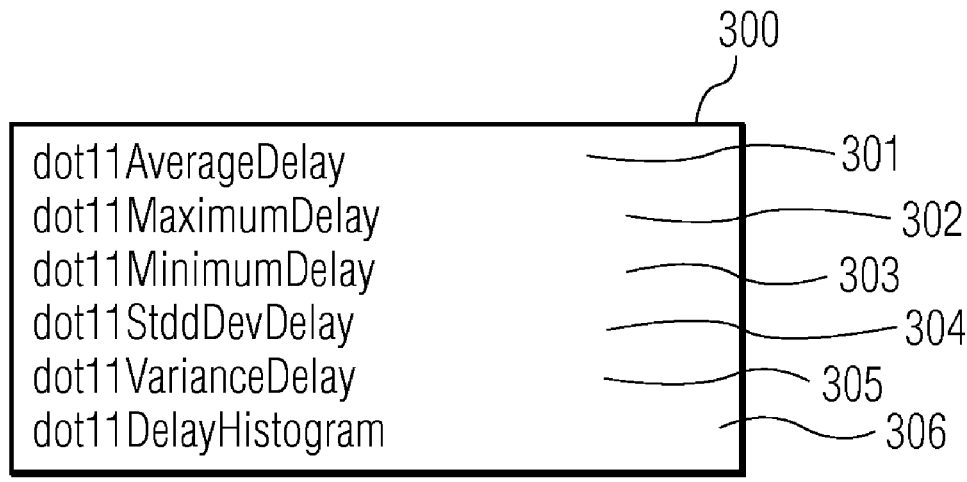
FIGS. 3a-3b are simplified schematic representations of management information bases (MIBs) in accordance with example embodiments.
Figure 3B:
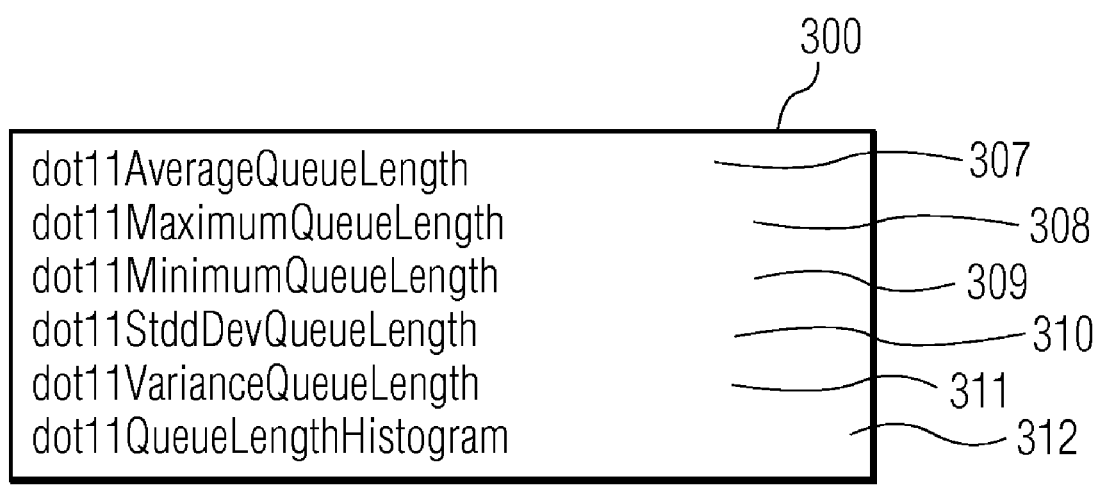

In accordance with certain example embodiments, the monitored parameters may be included in the management information base (MIB) as shown in FIGS. 3a and 3b. As is known, the MIB is usefully included in a QAP 101 or a QSTA 102 in accordance with the governing protocol (e.g., IEEE 802.11) of the wireless network. As can be readily appreciated, the collection of the data and the storing of the data in the MIB may be carried out in a network such as that of the example embodiment of FIG. 1 and via a method of the example embodiment of FIG. 2.

As shown in FIG. 3a, an MIB 300 may include an average delay 301 in a 32 byte register; a maximum delay 302 in a 32 byte register; a minimum delay 303 in a 32 byte register; a standard deviation of the delay 304; a variance in the delay in a 32 byte register; and a delay histogram 305 in a variable byte register. It is emphasized that these parameters are merely illustrative and that other parameters may be chosen for measure. Moreover, the units of these collected and stored parameters could be multiples or submultiples of seconds such as microseconds, milliseconds, slots, TUs, SIFS, PIFS, etc.

It is noteworthy that the parameters are further defined in accordance with example embodiments. For example, it may be useful to measure the MAC delay in a wireless network having a no-acknowledgement (no ACK) or block acknowledgement (block ACK) policy. For purposes of illustration, consider the MAC delay for a particular traffic type (e.g., MAC delay per traffic stream). The MAC delay for the packet data of the traffic stream could be defined as the time when the MAC service data units of the chosen traffic stream enters the MAC service access point (SAP) until the time that the MAC receives a physical layer transmission end (PHY TX-END) confirmation from the PHY layer of the QSTA or QAP undertaking the transmission or measurement. Thus, in a no ACK or block ACK policy network, the MAC delay can be defined as the time between the receipt of the packet from an upper layer until the time that confirmation of transmission by the PHY layer is transmitted by the PHY layer.

In a network that requires the transmission of an ACK, the delay could be defined as the time when the MDSU enters the MAC SAP until the time the MAC receives the ACK. For example, the MAC may receive a PHY-RX END indication message from the PHY layer for the corresponding ACK frame received from the receiving STA.

FIG. 3b shows the MIB 300 in accordance with another example embodiment. The MIB 300 in the present example embodiment includes various parameters related to the queue. To this end, the MIB 300 illustratively includes: an average queue length 307 in a 32 byte register; a maximum queue length 308 in a 32 byte register; a minimum queue length 309 in a 32 byte register; a standard deviation of the queue length 310; a variance in the queue length 311 in a 32 byte register; and a queue length histogram 312 in a variable byte register. Illustratively, the units of calculating and storing these data could be in multiples or submultiples of bytes, such as bits, kbytes, etc.

As can be appreciated, delay and queue information for the desired traffic type(s) may be gathered, stored and used for remedial action in a network such as described in connection with the example embodiment of FIG. 1. Moreover, the method of the example embodiment of FIG. 2 may be used to effect the gathering, storage and use. In addition, the delay and queue data may be monitored and collected in response to external stimuli, such as a measurement request by a QAP to a QSTA or some higher level network protocol command from upper layers to a QSTA. Additionally, the delay and queue data may be monitored or collected in response to internal stimuli, such as network congestion, or periodic monitoring, to name only a few.

As referenced previously, there are a number of illustrative traffic types for which the delay and queue data may be gathered. There are clear benefits to the acquisition of these data. Some illustrative benefits are described presently through examples.

As is well-known, the access categories are classes of data types in the MAC layer that are defined under the 802.11 standard. These categories include, but are not limited to a video category, a best effort category, a voice category and a background traffic category. By knowing the delay or queue length of a particular access category, decisions may be made regarding further transmissions of data in the category. For example, if the queue length of a video category is too great, and from other monitored information, a QSTA is aware of another QAP, the QSTA may request the neighboring QAP of its (neighboring QAPs) capabilities or its current state. The QSTA may then decide to create an association with the neighboring QAP for servicing of the video data.

Another known traffic type is the traffic stream. The requirements of a traffic stream are transmitted by a QSTA in a TSPEC. As can be appreciated, the QAP can maintain a time slot for the requesting QSTA based on the requirements. Thus, a queue is maintained for each traffic stream. Measurements of the delay or queue of the traffic stream provide will benefit the QSTA in decision relative to future transmissions. It may be useful, for example, to request additional time from QAP or to change data rates.

Another known traffic type is differentiated based on the user priority (UP). The UP is mapped to an access category, normally with two UPs per access category in the MAC layer. As is known, each access category has a different probability of accessing the channel or medium. The UP is at a higher layer and is mapped to an access category. As can be appreciated, the knowledge of the delay or queue length per user priority can be used to more efficiently transmit data based on the user priority. For example, it may be desirable to transmit data belonging to a certain UP below a certain average delay value. By knowing actual delays being encountered in MAC for the UP, a MAC can then change network parameters to bring delays of the UP traffic within desirable limits.

Finally, the delay or queue length, or both, may be gathered per station, instead of per traffic type. In this illustrative embodiment fewer computational, storage and measurement resources are needed to collect the desired data. In this manner, the delay or queue length may be used by the QSTA or the QAP, or both, to determine any possible corrective action based on the data as discussed previously. For example, if a QSTA experiences an unacceptable delay, it may request a greater amount of time from QAP or may look for another QAP with which to create an association.

FIGS. 4a through 8b show the frame formats (i.e., formats for data frames) for a variety of measurement requests and measurement reports in accordance with example embodiments. These frames may be transmitted by and between the QAP 101 and QSTAs 102 of the example embodiment of FIG. 1. Illustratively, these frames are transmitted in accordance with the transmission and reception protocols as set forth in the 802.11 standard and its progeny. Because many of the details of such a transmission are well-known to one of ordinary skill in the art, in order to prevent obscuring the description of the present illustrative embodiments, these details are omitted.

Figures 4A, 4B:
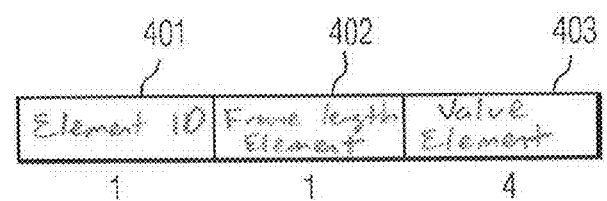
FIGS. 4a and 4b are measured QoS parameter report element formats of frames in accordance with example embodiments.

FIG. 4a is a report element format in accordance with an example embodiment. The frame includes an element ID 401, a frame length element 402 and a value element 403. The value element 403 may be measured delay or queue data of one or more of the traffic types described previously. Illustratively, this frame is transmitted in response to a measurement request or when unsolicited results of a measurements are being sent from a QSTA to a QAP.

FIG. 4b is an alternative report element format in accordance with another example embodiment. The frame includes an element ID 404, a length element 405 and a measured parameters elements. To with, a measured QoS parameter average value element 406, a measured maximum value element 407, a measured minimum value element 408, a measured standard deviation value element 409 and a measured variance value element 410 are included in the frame. As can be appreciated, the parameter may be one of the delay or the queue and may be per a particular traffic type, such as those described previously, or per station.

FIG. 5a is a request element format in accordance with an example embodiment. Illustratively, this frame may be used to request a histogram of a particular type of data. The frame includes an element ID 501, a length element 502, a first offset bin element 503, a number of bins element 504 and a bin interval 505. As is well known, bins are normally units of a parameter, such as time. The first offset bin provides the initial bin value, and the number of bins and the bin interval provide the parameters of the measure. For purposes of illustration, a histogram may be desired for the delay of a particular UP. The first offset bin may be delays of 5 msec, the bin interval may be 3 msec, and the number of bins may be five bins. From these data, the histogram may be garnered.

FIG. 5b is a measured QoS parameter request element format in accordance with an example embodiment. The frame includes an element ID 506, a length element 507, a first bin offset element 508, a number of bins element 509, a bin interval 510, a bin #1 value element 511, a bin #2 value element 512, and a bin #N value element 513, with a number (N−2) bin value elements between element 512 and element 513. The frame of FIG. 5b provides the bin values for each desired bin, with the bin value for each bin in its respective frame element. This frame would be transmitted from the requested QSTA or QAP to the requesting QSTA or QAP in response to a request frame, such as the frame of FIG. 5a. The frame of FIG. 5b provides desired measured delay data or measured queue data per traffic type or per station described previously. Beneficially, the bin data provide a histogram to the requesting QTSA or QAP.

Figure 6A:
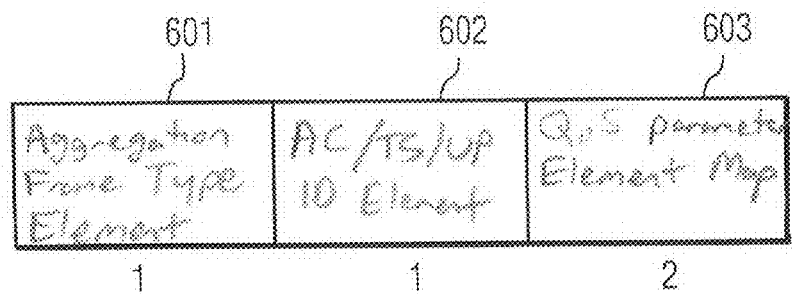
FIG. 6a-6b are QoS parameter measurement request frame body formats in accordance with example embodiments.

FIG. 6a is a measurement request frame body format in accordance with an example embodiment. The frame includes an aggregation type frame element 601 and an AC/TS/UP ID element 602. The frame element 601 includes the traffic type (or station) to be measured. For example, the frame 601 may indicate that the delay/queue measurements are to be per access category (AC), traffic stream (TS) or UP; and the ID element provides the specific type of AC, TS or UP. The frame 602 then includes the particular AC, TS or UP to be measured. The frame also includes a measured QoS parameter element map 603 that indicates precisely which parameter is to be measured. For example, this field request a histogram of the queue length per the TS measured. Of course, this is merely illustrative and other parameters may be measured in keeping with the example embodiments.

Figure 6B:
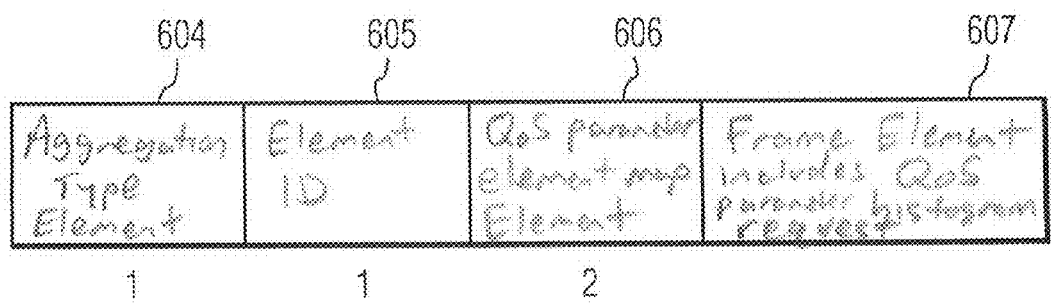

FIG. 6b is an alternative measurement request frame body format in accordance with an example embodiment. The frame includes an aggregation type element 604 and an element ID 605, which indicates the desired traffic type (or station) to be measured. The frame also includes a measured QoS parameter element map element 606, similar to that of the example embodiment of FIG. 5b. Finally, the frame includes a frame element 607 that includes one or more measured QoS parameter histogram request element. The frame element 607 thus requests the data of certain parameters previously described in the form of a histogram. For example, the element 607 may request the delay of a TS in the form of a histogram.

FIG. 7 is a measured QoS parameter request element map field in accordance with an example embodiment. The request element includes the aggregation type and its associated value. The request element map field may include the request of data per STA 701, per AC 702, per TS 703 and per UP 704. This field may be used for frame element 604 of FIG. 6b.

FIG. 8a shows a measured QoS parameter request element map field in accordance with an example embodiment. The field includes delay and queue types. To with, the field includes: an average delay field 801, a maximum delay field 802, a minimum delay field 803, a standard deviation delay field 804, a variance of delay field 805 and a histogram of delay field. The field also includes an average queue length field 807, a maximum queue length field 808 a minimum queue length field 809, a standard deviation queue length field 810, a variance of queue length field 811 and a histogram of queue length field 812.

The QoS parameter request element map field of FIG. 8a may be used instead of the frame of FIG. 6b, if in a system, the parameter to be measured is known in advance. For example, if the parameter is defined by the system architecture, then the frame elements 604 and 605 could be omitted or part of it could be merged or combined. For example, if the frame of FIG. 3a were used, then a subset of bits could be combined and represented as a single bit (e.g., the value in FIG. 7). If unmeasured quantities are returned by the measuring node, these could be indicated by predetermined field codes, for example 0xFF.

FIG. 8b is a measurement report frame in accordance with an example embodiment. The report frame includes an aggregation type frame element 814, an AC/TS/UP ID frame element 815, a measured QoS parameter element map 815, a status code 816 and a measured QoS parameter(s) element or measured QoS parameter(s) histogram(s) 817. The elements 813, 814 and 815 are virtually the same as those transmitted by the requesting QAP or QSTA (e.g., frame elements 604, 605 and 606, respectively). The status code element 816 includes a code(s) that is assigned bit encodings corresponding to different error conditions that may be encountered when completing the request. These include, but are not limited to measurement refused; measurement not supported; measurement parameter not supported; and similar errors. Finally, the frame element 817 includes the data or histograms of the requested parameters. These comport to the delay or queue of the chosen traffic type or station.

In view of this disclosure it is noted that various methods, devices and networks described in conjunction with measuring and monitoring in wireless networks of the example embodiments can be implemented in hardware and software. Furthermore, the various methods, devices and parameters are included by way of example only and not in any limiting sense. In view of this disclosure, those skilled in the art can implement the various example methods, devices and networks in determining their own techniques and needed equipment to effect these techniques, while remaining within the scope of the appended claims.

The invention claimed is:

1. A wireless network, comprising:
a plurality of wireless stations (QSTAs); and
an access point (QAP), wherein the QAP, or one or more of the QSTAs, or both, measures delay data,
wherein if no acknowledgement is required, the delay data being based on the time when a MAC service data unit enters a MAC service access point until the time that the MAC service access point receives a physical layer transmission end confirmation, per one or more traffic type, or per QSTA;
and wherein if acknowledgement is required, the delay data being based on the time that a MAC layer receives the physical layer reception end confirmation from a physical layer for receipt of an acknowledgement message from one of the QSTAs receiving the MAC service data unit.

2. The wireless network of claim 1, wherein the one or more traffic types include: an access category, a traffic stream, or a user priority.

3. The wireless network of claim 1, wherein the delay data are one or more of: an average delay, a maximum delay, a minimum delay, a standard deviation of the delay, a variance of the delay, or a histogram of the delay.

4. The wireless network of claim 1, wherein a QSTA makes a request for the delay data.

5. The wireless network of claim 1, wherein the QAP, or one or more of the QSTAs, or both, measures queue data, wherein a QSTA makes a request for queue data.

6. The wireless network of claim 1, wherein a QSTA reports the delay data.

7. The wireless network of claim 5, wherein a QSTA reports the queue data.

8. The wireless network of claim 1, wherein the QAP makes a request for the delay data.

9. The wireless network of claim 5, wherein the QAP makes a request for the queue data.

10. The wireless network of claim 1, wherein the QAP reports the delay data.

11. The wireless network of claim 5, wherein the QAP reports the queue data.

12. The wireless network claim 5, wherein the queue data are one or more of: an average queue length, a maximum queue length, a minimum queue length, a standard deviation of a queue length, a variance of a queue length, or a histogram of queue length data.

13. A method of wireless communication between an access point and a plurality of wireless stations, the method comprising:
the access point and/or at least one wireless station measuring delay data, wherein if no acknowledgement is required, the delay data being based on the time when a MAC service data unit enters a MAC service access point until the time that the MAC service access point receives a physical layer transmission end confirmation, per one or more traffic type, or per wireless station (QSTA); and wherein if acknowledgement is required, the delay data being based on the time that a MAC layer receives the physical layer reception end confirmation from a physical layer for receipt of an acknowledgement message from one of the plurality of wireless stations receiving the MAC service data unit; and, if necessary, taking an action based on the data.

14. The method of claim 13, wherein the one or more traffic types include: an access category, a traffic stream, or a user priority.

15. The method of claim 13, wherein the delay data are one or more of: an average delay, a maximum delay, a minimum delay, a standard deviation of the delay, a variance of the delay, or a histogram of the delay.

16. The method of claim 13, the method further comprising:
requesting delay data from the QSTA by the QAP.

17. The method of claim 13, the method further comprising:
the access point and/or at least one wireless station measuring queue data, and
requesting queue data from the QSTA by the QAP.

18. The method of claim 13, the method further comprising:
reporting the delay data by the QAP to the QSTA.

19. The method of claim 17, the method further comprising:
reporting the queue data by the QAP to the QSTA.

20. The method of claim 17, wherein the queue data are one or more of: an average queue length, a maximum queue length, a minimum queue length, a standard deviation of a queue length, a variance of a queue length, or a histogram of queue length data.

* * * * *